(12) United States Patent
Xu et al.

(10) Patent No.: US 8,280,059 B2
(45) Date of Patent: Oct. 2, 2012

(54) METHOD, SYSTEM AND DEVICE FOR GENERATING GROUP KEY

(75) Inventors: Chunxiang Xu, Shenzhen (CN); Huan Zhong, Shenzhen (CN); Ya Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 12/603,920

(22) Filed: Oct. 22, 2009

(65) Prior Publication Data

US 2010/0040236 A1 Feb. 18, 2010

Related U.S. Application Data

(63) Continuation of application No. PCT/CN2008/071104, filed on May 27, 2008.

(30) Foreign Application Priority Data

Jun. 8, 2007 (CN) .......................... 2007 1 0100375

(51) Int. Cl.
*H04K 1/00* (2006.01)
*H04L 9/00* (2006.01)
*H04L 9/08* (2006.01)
*H04L 9/28* (2006.01)
*H04L 29/06* (2006.01)
*H04L 9/32* (2006.01)

(52) U.S. Cl. ........ 380/278; 380/255; 380/259; 380/262; 380/44; 380/28; 713/150; 713/151; 713/153; 713/168

(58) Field of Classification Search .................. 380/278, 380/255, 259, 262, 44, 28; 713/150, 151, 713/153, 168
See application file for complete search history.

(56) References Cited

U.S. PATENT DOCUMENTS

| 5,272,755 | A | 12/1993 | Miyaji et al. |
| 6,212,279 | B1 | 4/2001 | Reiter et al. |
| 6,941,457 | B1 | 9/2005 | Gundavelli et al. |
| 6,987,855 | B1 | 1/2006 | Srivastava |
| 7,096,356 | B1 | 8/2006 | Chen et al. |
| 7,181,014 | B1 | 2/2007 | Srivastava |
| 2003/0190042 | A1* | 10/2003 | Tagashira et al. ............... 380/45 |

(Continued)

FOREIGN PATENT DOCUMENTS

CN 1543118 A 11/2004

(Continued)

OTHER PUBLICATIONS

Ingemarsson, I. et al., "A conference key distribution system" IEEE Transactions on Information Theory, Sep. 1982, pp. 714-720, vol. IT-28, No. 5, 0018-9448/82/0900-0714 © 1982 IEEE.

(Continued)

*Primary Examiner* — Aravind Moorthy
(74) *Attorney, Agent, or Firm* — Finnegan, Henderson, Farabow, Garrett & Dunner LLP

(57) ABSTRACT

A method for generating a group key are provided in the field of network communications. The method includes the following steps: Group members select DH secret values and generate DH public values. An organizer generates an intermediate message and broadcasts a DH public value and the intermediate message. The group members generate a group key according to a DH secret value selected by the organizer and DH public values of the other group members except the organizer. A system for generating a group key and communication devices are also disclosed in the present invention.

7 Claims, 8 Drawing Sheets

U.S. PATENT DOCUMENTS

2007/0165865 A1* 7/2007 Talvitie .................. 380/286
2009/0282249 A1* 11/2009 Aamknecht et al. .......... 713/171

FOREIGN PATENT DOCUMENTS

CN 1667999 A 9/2005

OTHER PUBLICATIONS

Yasinsac, A. et al., "A Family of Protocols for Group Key Generation in Ad Hoc Networks," Computer Science Department, Florida State University, yasinsac@cs.fsu.edu.
Steiner, M. et al., "A New Approach to Group Key Agreement."
Burmester, M. et al., "A secure and efficient conference key distribution system."
Kim, Y. et al., "Communication-efficient group key agreement."
Becker,K, et al., "Communication complexity of group key distribution system."
Manulis, M., "Contributory group key agreement protocols, revisited for mobile ad-hoc groups," 0-7803-9466-6/05/ © 2005 IEEE MASS 2005 Workshop—WSNS05.
Steiner, M. et al., "Diffie-Hellman Key Distribution Extended to Group Communication," CCS '96, © 1996 ACM 0-89691-829-0/96/03 pp. 31-37, New Delhi, India.
Steiner, M. et al., "Key Agreement in Dynamic Peer Groups," IEEE Transactions on Parallel and Distributed Systems, pp. 769-780, vol. 11, No. 8, Aug. 2000, 1045-9210/00 © 2000 IEEE.
Diffie, W. et al., "New Directions in Cryptology," IEEE Transactions on Information Theory, pp. 644-654, vol. IT-22, No. 6, Nov. 1976.
Ateniese, G. et al. "New multiparty authentication services and key agreement protocols," IEEE Journal on Selected Areas in Communications, pp. 628-639, vol. 18, No. 4, Apr. 2000, 0733-8716/00 © 2000 IEEE.
Kim, Y. et al., "Simple and Fault-Tolerant Key Agreement for Dynamic Collaborative Groups," CCS '00, Athens, Greece, © 2000 ACM 1-58113-203-4/00/0011.
Liao, L. et al., "Tree-Based Group Key Agreement Framework for Mobile Ad-Hoc Networks," Proceedings of the $20^{th}$ International Conference on Advanced InformationNetworking and Applications (AINA '06) 1550—445X/06 © 2006 IEEE.
Written Opinion of the International Searching Authority (translation) dated (mailed) Aug. 28, 2008, issued in related Application No. 08SGHW051PCT, filed May 27, 2008, Huawei Technologies Co., Ltd.
Extended European Search Report dated (mailed) Jan. 30, 2012, issued in related Application No. 08757518.9-1525, PCT/CN2008071104, Hauwei Technologies Co., Ltd.
Schneier, Bruce, *Key-Exchange Algorithms*, "Applied Cryptography," pp. 513-515, XP-002667535 1996, USA.
Li, Depeng, et al., "An Efficient Group Key Establishment in Location-aided mobile ad hoc Networks", ACM, pp. 57-64, XP040028173, New York, USA, 2005.
Menezes, et al., "Handbook of Applied Cryptography," CRC Press LLC, XP002667536, pp. 515-516. 1997, USA.

* cited by examiner

METHOD, SYSTEM AND DEVICE FOR GENERATING GROUP KEY

CROSS-REFERENCE TO RELATED APPLICATIONS

This application is a continuation of International Application No. PCT/CN2008/071104, filed on May 27, 2008, which claims priority to Chinese Patent Application No. 200710100375.5, filed on Jun. 8, 2007, both of which are hereby incorporated by reference in their entireties.

FIELD OF THE INVENTION

The present invention relates to the field of network communications, and more particularly to a method, a system, and a device for generating a group key.

BACKGROUND OF THE INVENTION

An Ad Hoc network is a multi-hop self-organizing network with a dynamically changing topological structure, in which nodes are frequently moved and power-limited, and a trust relationship and wireless transmission links among the nodes are rather poor. Thus, the design of a group key negotiation protocol in the Ad Hoc network is significantly different from the conventional solution. In the Ad Hoc network, in order to ensure the communication security, messages are generally encrypted and then transmitted. Due to the advantage of a symmetric cryptosystem in efficiency, the complexity of message processing is reduced greatly by sharing a key in the group. Meanwhile, the Ad hoc network is also a dynamic peer group, and is lack of the support of a fixed trustable third party, so that a group session key for encrypting the messages needs to be established through the negotiation of all group members, so as to improve the security and reliability of the group session key. Furthermore, the group key negotiation protocol in the Ad Hoc network is required to take the dynamic topology characteristics of the network into consideration, and to realize the forward security and backward security of the key and efficiently support the joining and leaving motions of nodes.

All the existing group key negotiation solutions are based on the discrete logarithm problem in the finite field. There is a group key negotiation solution applicable to the Ad Hoc network, in which n represents the number of group members; $U_i$ represents a group member with a serial number of i; $U_1$ represents a selected organizer, and the organizer is temporary and may be played by any member. FIG. 1 is a flow chart of a method of a group key negotiation solution in the prior art. Referring to FIG. 1, the group key negotiation solution includes:

101: System parameters are selected, and a system initialization is performed.

Supposed that p and q are large prime numbers, $Z_p$ is a collection formed by the integer modulo p, g is an element in $Z_p$, and an order of g is q, in which q is the minimum positive integer that satisfies an equation $g^q \equiv 1 \mod q$.

102: All members select DH secret values, generate DH public values according to the DH secret values, and broadcast the generated DH public values in the group. The group member $U_i$ randomly selects a DH secret value $r_i \square Z_q$, generates a DH public value $g^{r_i}$ according to the selected DH secret value, and broadcasts the generated DH public value $g^{r_i}$ in the group, in which i goes through 1, 2, ..., n.

103: After receiving the DH public values of the other members, an organizer selects a secret exponent, generates an intermediate message according to the secret exponent and the DH public values, and broadcasts the intermediate message in the group, and meanwhile generates a group key.

The organizer $U_1$ randomly selects a secret exponent $v \square Z_q$, generates an intermediate message $M_i$, $M_i = v \cdot g^{r_i r_i}$ according to the secret exponent, a DH public value of the organizer itself, and the DH public values of the other members respectively, and broadcasts the generated message $M_i$ in the group, in which i goes through 1, 2, ..., n.

Specifically, the organizer computes a function $F = f(g^{r_1}, g^{r_2}, ..., g^{r_n})$ according to the DH public value of each member and the DH public value of the organizer itself, in which $f$ represents a mapping from $Z_p$ to $Z_q$, and then generates a group key $K = g^{F \circ v}$ according to the secret exponent v.

104: After receiving the intermediate message broadcasted by the organizer, each group member extracts the secret exponent and generates a group key according to the secret exponent and the DH public value of each member.

After receiving $M_i$, all the group members $U_i$ decrypt the v value, and compute the function $F = f(g^{r_1}, g^{r_2}, ..., g^{r_n})$, in which $f$ represents a mapping from $Z_p$ to $Z_q$. Then, the group members $U_i$ compute a group key $K = g^{F \circ v}$, in which the symbol ∘ represents that F and v are mathematically operated and a result thereof needs to be modulo p.

Through the above steps, the group keys computed by all the group members $U_i$ are the same, that is, the group key $K = g^{F \circ v}$.

When a member joins or leaves the group, it is required to re-generate a group key according to all the current group members after the change of group members, in which the computation is similar to the above process, and will not be repeated herein.

In the implementation of the present invention, the inventors find that the group key negotiation solution of the Ad Hoc network requires a large amount of computation, and thus has a low processing speed, a large storage space and a high bandwidth requirement.

SUMMARY OF THE INVENTION

In order to reduce the amount of computation and the occupied storage space, and lower the bandwidth requirement of the group key negotiation solution, various embodiments of the present invention provide a method, a system, and devices for generating a group key. The technical solutions are described as follows.

A method for generating a group key is provided in one embodiment, in which system parameters are selected based on an elliptic curve and the following steps are carried out.

Group members form a star-shaped structure and select an organizer from the group members.

The group members individually select DH secret values randomly according to the system parameters, individually generate DH public values according to the system parameters and the selected DH secret values, and broadcast the DH public values in the group.

After receiving the DH public values of the other group members, the organizer selects a secret exponent, computes an intermediate message DH value according to the secret exponent, generates an intermediate message carrying the intermediate message DH value, broadcasts the intermediate message in the group, and generates a group key according to the DH secret value selected by the organizer and the DH public values of the other group members.

After receiving the intermediate message and a DH public value of the organizer, the other group members compute the DH secret value selected by the organizer according to the intermediate message, verify the computed DH secret value selected by the organizer to be correct according to the received DR public value of the organizer, and generate a group key according to the DH secret value selected by the organizer and the DH public values of the other group members.

A system for generating a group key is provided in one embodiment. The system includes a communication device as an organizer and a communication device as members.

The communication device as the organizer is configured to select a DH secret value according to system parameters, generate a DH public value according to the system parameters and the selected DH secret value, and broadcast the DH public value in the group; and after receiving DH public values of the other devices, the communication device as the organizer is further configured to select a secret exponent, compute an intermediate message DH value according to the secret exponent, generate an intermediate message carrying the intermediate message DH value, broadcast the intermediate message in the group, and generate a group key according to the selected DH secret value and DH public values of all devices in the group.

The communication device as the members is configured to select DH secret values according to system parameters, generate DH public values according to the system parameters and the selected DH secret values, and broadcast the DH public values; and after receiving the DH public value and the intermediate message broadcasted by the communication device as the organizer, the communication device as the members is further configured to compute the DH secret value selected by the organizer according to the intermediate message, verify the computed DH secret value selected by the organizer to be correct, and then generate a group key according to the DH secret value selected by the organizer and the DH public values of all the devices in the group.

Furthermore, a communication device is provided in one embodiment. The device includes a system parameter selecting module, a DH public value generating and broadcasting module, an intermediate message generating and broadcasting module, and an organizer group key generating module.

The system parameter selecting module is configured to select system parameters based on an elliptic curve.

The DH public value generating and broadcasting module is configured to select a DH secret value according to the system parameters selected by the system parameter selecting module, generate a DH public value according to the system parameters and the selected DH secret value, and broadcast the DH public value.

The intermediate message generating and broadcasting module is configured to select a secret exponent after receiving DH public values broadcasted by other communication devices, compute an intermediate message DH value according to the secret exponent, generate an intermediate message carrying the intermediate message DH value according to the DH secret value selected by the DH public value generating and broadcasting module, and broadcast the intermediate message.

The organizer group key generating module is configured to receive the DH public values broadcasted by other communication devices, and generate a group key according to the DH secret value selected by the DH public value generating and broadcasting module and the DH public values broadcasted by other communication devices.

A communication device is provided in one embodiment. The device includes a system parameter selecting module, a DH public value generating and broadcasting module, and a member group key generating module.

The system parameter selecting module is configured to select system parameters based on an elliptic curve.

The DH public value generating and broadcasting module is configured to select DH secret values according to the system parameters selected by the system parameter selecting module, generate DH public values according to the system parameters and the selected DH secret values, and broadcast the DH public values.

The member group key generating module is configured to receive a DH public value and an intermediate message broadcasted by another communication device, compute a DH secret value selected by an organizer according to the intermediate message, verify the computed DH secret value selected by the organizer to be correct according to the DH public value broadcasted by the communication device that broadcasts the intermediate message, and generate a group key according to the DH secret value selected by the organizer and DH public values broadcasted by all the other communication devices except the communication device that broadcasts the intermediate message.

The technical solutions of embodiments of the present invention are based on an elliptic curve cryptography system, in which an organizer safely transmits a secret exponent to the other group members via an intermediate message DH value shared with the other group members, and then all the members negotiate based on the public key cryptographic technique on an elliptic curve to obtain a group key. Compared with the prior art, the technical solutions of the present invention have advantages of a high computation speed, small storage space, and low network bandwidth requirement, while maintaining the same security.

DETAILED DESCRIPTION OF THE EMBODIMENTS

In order to make the objects, technical solutions, and advantages of the embodiments of the present invention more comprehensible, embodiments of the present invention are further described in detail as follows with reference to the accompanying drawings.

The embodiments of the present invention provide a method, a system, and a device for generating a group key, which are applicable to an Ad Hoc network. Specifically, group members form a star-shaped structure, and a member is selected to be an organizer, who is responsible for safely transmitting a secret exponent to the other group members via an intermediate message DH value shared with the other group members, and then all the members negotiate based on the public key cryptographic technique on an elliptic curve to obtain a group key. The intermediate message DH value is a parameter obtained based on a Diffie-Hellman key negotiation protocol (briefly referred to as a DH key negotiation protocol) on the elliptic curve.

The embodiments of the present invention are based on an elliptic curve cryptography system. Elliptic curve cryptography (ECC) was set forth by Neal Koblitz and Victor Miller in the year of 1985. The elliptic curve cryptography system has advantages of a high security, low computation load, short key length, high processing speed, small occupied storage space, low bandwidth requirement and so on, thus has a wide application prospect in the field of security. Recently, the elliptic curve cryptography system has been accepted as a standard by standardization organizations, such as American National Standard Institute (ANSI), Institute of Electrical and Electronics Engineers (IEEE), International Standardization Organization (ISO), and National Institute of Standards and Technology (NIST).

Embodiment 1

Figure 1:
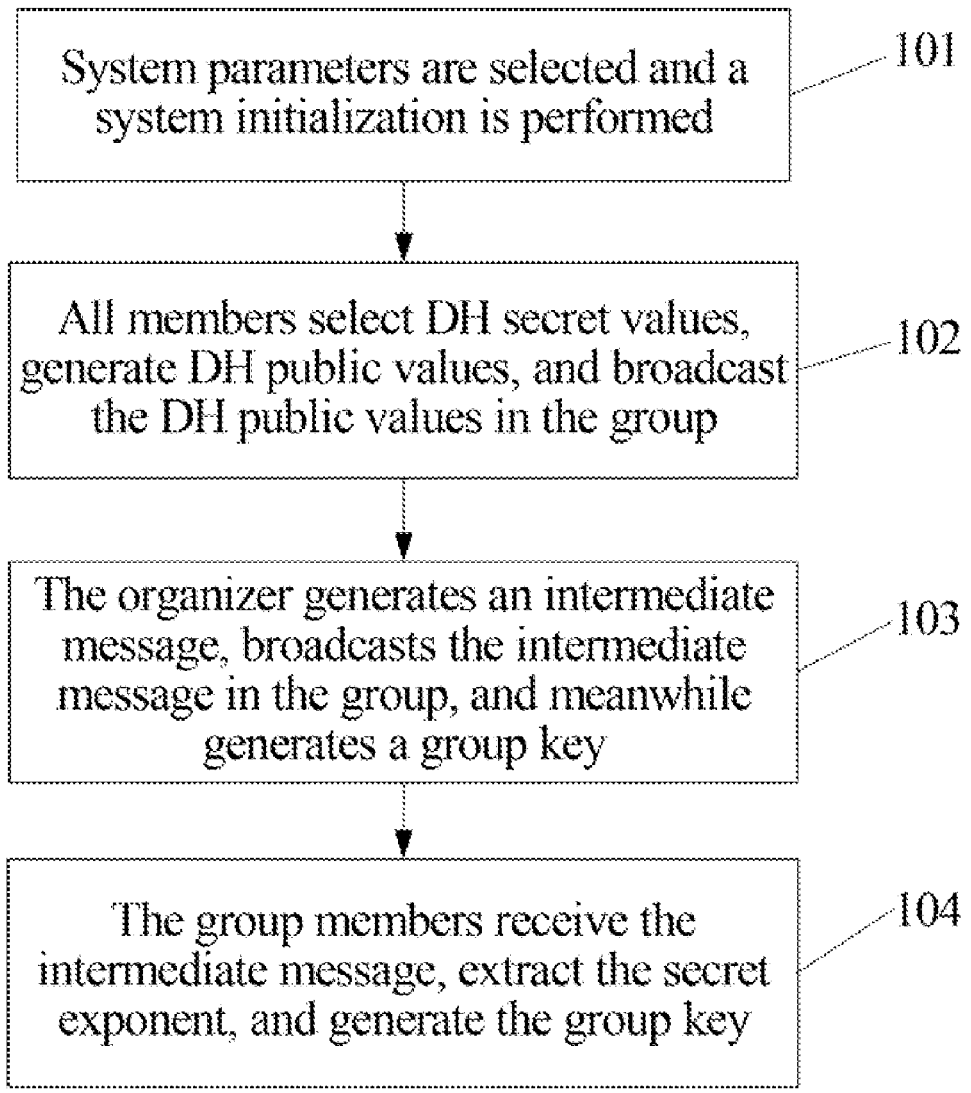
FIG. 1 is a flow chart of a method for generating a group key in the prior art.
Figure 2:
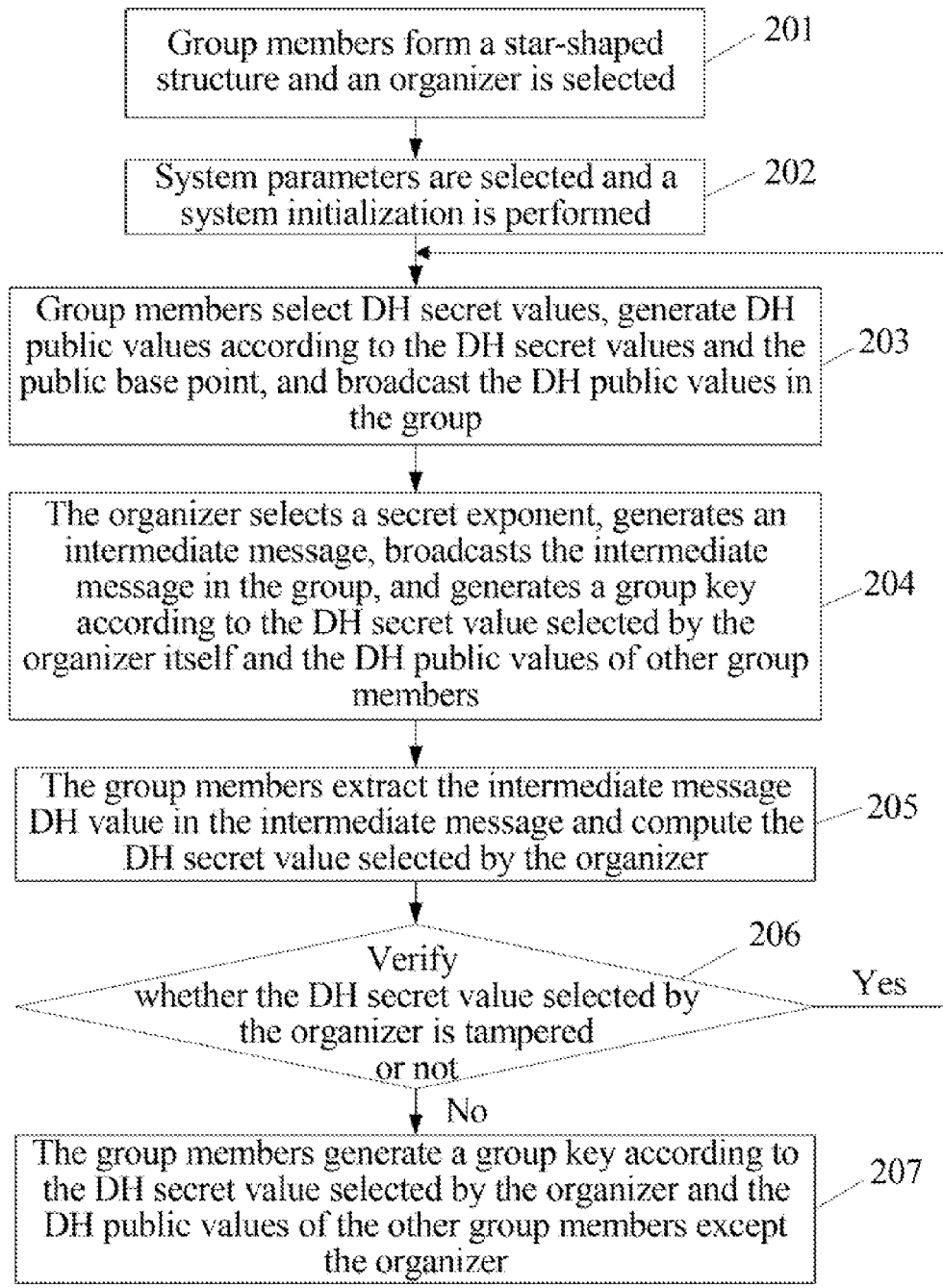
FIG. 2 is a flow chart of a method for generating a group key according to Embodiment 1 of the present invention.

FIG. 2 is a flow chart of a method for generating a group key according to an embodiment of the present invention. Referring to FIG. 2, the method includes:

201: Group members $U_1, \ldots, U_n$ form a star-shaped structure, and an organizer is selected.

Figure 3:
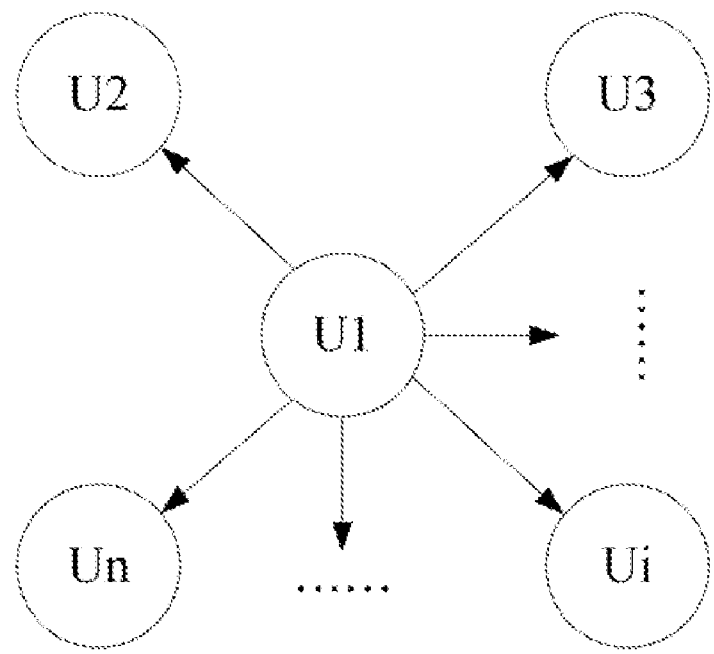
FIG. 3 is a schematic view of a star-shaped structure formed by group members according to Embodiment 1 of the present invention.

According to the embodiment of the present invention, n represents the number of group members, and $U_i$ represents a group member with a serial number i (i=1, 2, ..., n). A group member is selected as an organizer, and in this embodiment $U_1$ is selected as the organizer. The organizer is not trusty, but is temporary, which can be played by any member. FIG. 3 is a schematic view of a star-shaped structure formed by group members.

202: System parameters are selected, and a system initialization is performed. The specific process is described as follows.

GF(p) is a finite field with an order as a prime number p, and an elliptic curve EC: $y^2 = x^3 + ax + \beta(a, \beta \square GF(p), 4a^3 + 27\beta^2 \pmod{p}) \neq 0$; and p is a large prime number of above 190 bits) is defined in the field. $Ec_p(a, \beta) = \{(x, y) | y^2 = x^3 + ax + \beta \pmod{p}\} \square O$ (O is the identity) forms an Abel group—commutative group.

As for a given ECC system, a point $P \square Ec_p(a, \beta)$ is selected as a public base point, and the order of P is a large prime number q (generally, $q \geq 120$ bits). It is defined G={O, P, 2P, ..., (q−1)P}. Thus, it can be known that G is a finite cyclic Abel group, and q is a cyclic period.

203: A group member $U_i$ selects a DH secret value $r_i \square Z_q$ according to the system parameters, generates a DH public value $X_i = (x_i, y_i) = r_i P$ according to the DH secret value $r_i$ and the public base point P, and broadcasts the DH public value $X_i = (x_i, y_i) = r_i P$ in the group, in which i goes through 1, ..., n.

204: After receiving DH public values $X_i$ broadcasted by the other members, the organizer $U_1$ randomly selects a secret exponent $z \square Z_q$ ($Z_q$ is a collection of minimum non-negative residues obtained after integers are modulo q, and q is a prime number among the system parameters), computes an intermediate message DH value zP=(x, y) based on the Diffie-Hellman key negotiation protocol on the Elliptic-Curve, generates an intermediate message $\{C_1, C_2, \ldots, c_n\} = \{r_1 x \pmod{p}, r_2 zP, r_3 zP, \ldots, r_n zP\}$, in which p is a prime number among the system parameters, according to the received DH public values of the other members, the selected secret exponent z, the DH secret value $r_1$, and the x-coordinate of the intermediate message DH value zP, broadcasts the intermediate message $\{c_1, c_2, \ldots, c_n\} = \{r_1 x \pmod{p}, r_2 zP, r_3 zP, \ldots, r_n zP\}$ in the group; generates a group key $K = r_1(r_2 P + r_3 P + \ldots + r_n P)$ according to the DH secret value $r_1$, selected by the organizer itself and the DH public values of the other members.

It should be noted that, in this embodiment, the intermediate message may also be generated according to the received DH public values of the other members; the selected secret exponent z, the DH secret value $r_1$, and the y-coordinate of the intermediate message DH value zP. The specific principle is similar to that of generating the intermediate message according to the received DH public values of the other members, the selected secret exponent z, the DH secret value $r_1$, and the x-coordinate of the intermediate message DH value zP, and will not be repeated herein.

205: After receiving the intermediate message broadcasted by the organizer $U_1$, the group member $U_i$ (i goes through 2, 3, ..., n) extracts the intermediate message DH value in the intermediate message, in which the intermediate message DH value zP is specifically obtained by computing $zP = (x, y) = r_i^{-1} c_i$, and then, according to the intermediate message DH value $zP = (x, y)$, the x is obtained. As $c_1 = r_1 x \pmod{p}$, $r_1 = c_1 x^{-1} \pmod{p}$, so that the DH secret value $r_1$ selected by the organizer is computed.

206: After computing the DH secret value $r_1$ selected by the organizer, the group member $U_i$ (i goes through 2, 3, ..., n) verifies whether an equation $r_1 P = X_1$ is satisfied or not, and if yes, 207 is executed; otherwise, 203 is re-executed.

The verification of the equation $r_1 P = X_1$ aims at verifying whether the DH secret value selected by the organizer is tampered or not.

207: The group member $U_i$ (i goes through 2, 3, ..., n) generates a group key $K = r_1(r_2 P + r_3 P + \ldots + r_n P)$ according to the DH secret value selected by the organizer and the DH public values of all the other group members except the organizer.

Through the above process, the group keys computed by all the group members $U_i$ are the same, that is, the group key $K = r_1(r_2 P + r_3 P + \ldots + r_n P)$, and all the members reserve the $X_i$ values received in the key negotiation stage.

Embodiment 2

Figure 4:
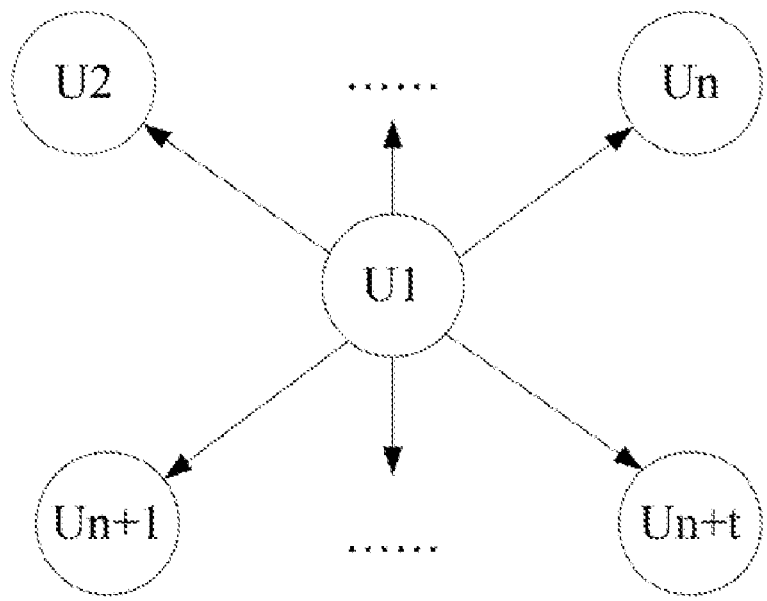
FIG. 4 is a schematic view of a star-shaped structure formed by group members when new members join the group according to Embodiment 2 of the present invention.

In this embodiment, a method for generating a group key through negotiation when new members join the group is provided. This embodiment is based on Embodiment 1. It is assumed that the group $\Sigma = \{U_1, U_2, \ldots, U_n\}$ has executed the basic negotiation of Embodiment 1 and has obtained the shared group key $K = r_1(r_2 P + r_3 P + \ldots + r_n P)$. Now, t members are intended to join the group $\Sigma$, which are respectively represented as $U_{n+1}, U_{n+2}, \ldots, U_{n+t}$. The negotiation process about a new key requires the newly-added t members and the organizer $U_1$ to participate in. Referring to FIG. 4, $U_1$, $U_2, \ldots, U_{n+1}$ together form a star-shaped structure.

Figure 5:
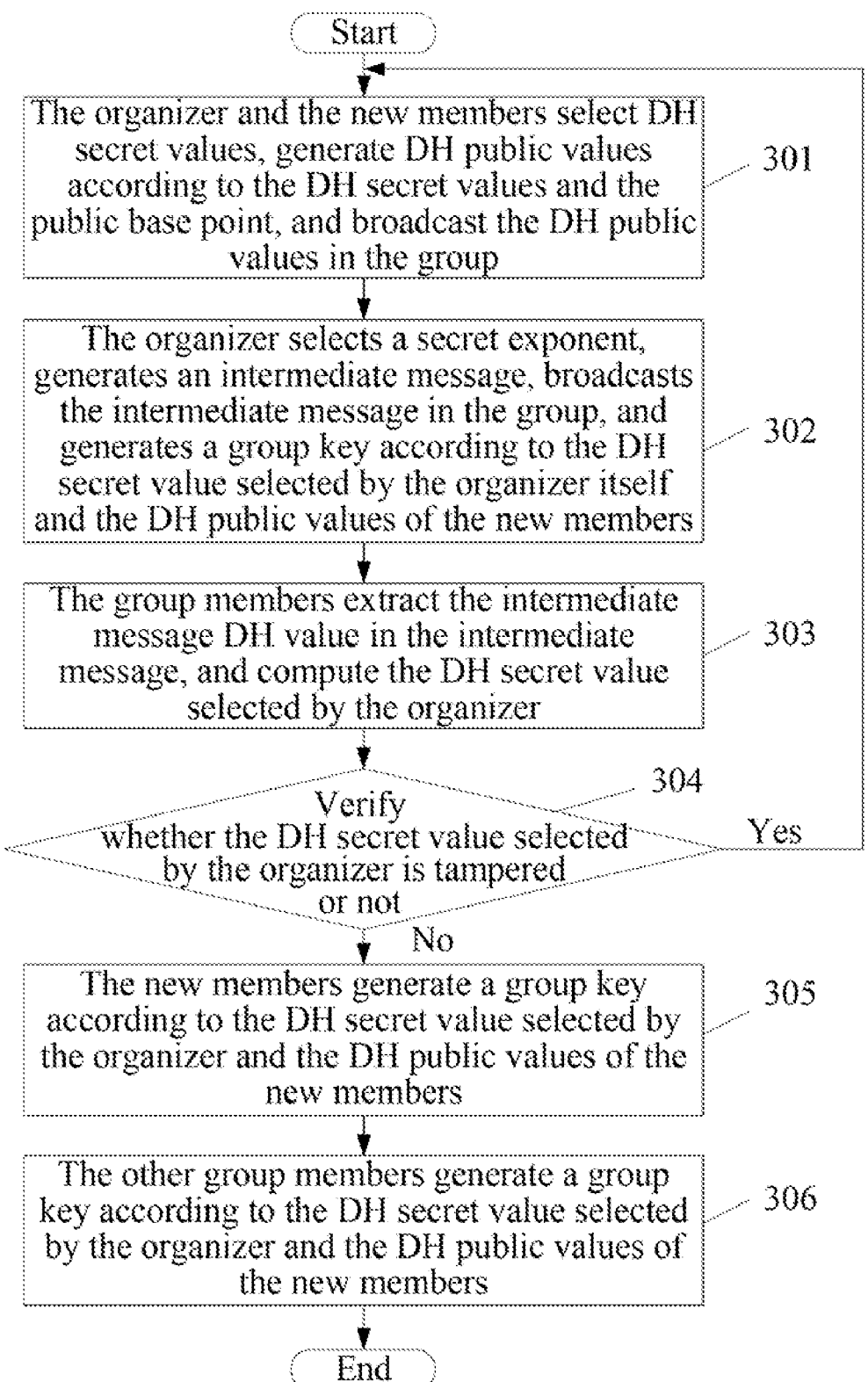
FIG. 5 is a flow chart of a method for generating a group key when new members join the group according to Embodiment 2 of the present invention.

FIG. 5 is a flow chart of a method for generating a group key when new members join the group. Referring to FIG. 5, the method for generating a group key when new members join the group includes:

301: The organizer $U_1$ and new member $U_i$ select DH secret values $r'_i \square Z_q$ according to the system parameters, generate DH public values $X'_i=(x'_i, y'_i)=r'_iP$ according to the DH secret values $r'_i$ and the public base point P, and broadcast the DH public values $X'_i=(x'_i, y'_i)=r'_iP$ in the group, in which i goes through n+1, ..., n+t.

302: After receiving the DH public values $X'_i$ broadcasted by the new members, supposed that a secret exponent $z'=x_K$, the organizer $U_1$ computes an intermediate message DH value $z'P=(x', y')$ based on Diffie-Hellman key negotiation protocol on the Elliptic-Curve, generates an intermediate message $\{c'_1, c'_{n+1}, \ldots, c'_{n+t}\}=\{r'_1x'(\bmod p), r'_{n+1}z'P, r'_{n+2}z'P, \ldots, r'_{n+t}z'P\}$ carrying the intermediate message DH value broadcasts the intermediate message $\{c'_1, c'_{n+1}, \ldots, c'_{n+t}\}=\{r'_1x' (\bmod p), r'_{n+1}z'P, r'_{n+2}z'P, \ldots, r'_{n+t}z'P\}$ in the group, and generates a new group key $K'=r'_1(r'_{n+1}+P+r'_{n+2}P+ \ldots r'_{n+t}P)$ according to the DH secret value $r'_1$ selected by the organizer itself and the DH public values of the new members.

In this embodiment, $x_K$ represents an x-coordinate of the key K shared by $\Sigma=t\{U_1, U_2, \ldots, U_n\}$ and all the group members know that the organizer $U_1$ selects the x-coordinate or the y-coordinate as z' in advance. The organizer $U_1$ selects the x-coordinate as z', and may also supposed that $z'=y_K$, that is, the organizer $U_1$ selects the y-coordinate as z'.

303: After receiving the intermediate message $\{c'_1, c'_{n+1}, \ldots, c'_{n+t}\}=\{r'_1x'(\bmod p), r'_{n+1}z'P, r'_{n+2}z'P, \ldots, r'_{n+t}z'P\}$ broadcasted by the organizer $U_1$, the new member $U_i$ ($i \square \{n+1, \ldots, n+t\}$) extracts the intermediate message DH value in the intermediate message, in which the intermediate message DH value $z'P$ is specifically obtained by computing $z'P=(x', y')=r'_i^{-1}c'_i$, and then, according to the intermediate message DH value $z'P=(x', y')$, the x' is obtained. As $c'_1=r'_1x'(\bmod p)$, $r'_1=c'_1x'^{-1}(\bmod p)$, so that the DH secret value $r'_1$ selected by the organizer is computed.

304: After computing the DH secret value $r'_1$ selected by the organizer, the new member $U_i$ ($i \square \{n+1, \ldots, n+t\}$) verifies whether the equation $r'_1P=X'_1$ is satisfied or not, and if yes, 305 is executed; otherwise, 301 is re-executed.

The verification of the equation $r'_1P=X'_1$ aims at verifying whether the DH secret value selected by the organizer is tampered or not.

305: The new member $U_i$ ($i \square \{n-1, \ldots, n+t\}$) generates a new group key $K'=r'_1(r'_{n+1}P+r'_{n+2}P+ \ldots r'_{n+t}P)$ according to the DH secret value selected by the organizer and the DH public values of the new members.

306: The other members $U_2, \ldots, U_n$ in the group $\Sigma$ obtain $Z'=x_K$ according to the previous z value, compute $z'P=(x', y')=r'_i^{-1}c'_i$ ($i \square \{2, \ldots, n\}$), and then get the x' according to the intermediate message DH value $z'P=(x', y')$. As $c'_1=r'_1x'(\bmod p)$, $r'_1=c'_1x'^{-1}(\bmod p)$, so that the DH secret value $r'_1$ selected by the organizer is computed. Then, according to the DH secret value $r'_1$ selected by the organizer and the DH public values of the new members, each of the other members $U_2, \ldots, U_n$ generates a new group key $K'=r'_1(r'_{n+1}P+r'_{n+2}P+ \ldots r'_{n+t}P)$.

Through the above process, after the t members have joined the group $\Sigma$, each group member $U_i$ ($i \square \{1, \ldots, n+t\}$) computes a new group key $K'=r'_1(r'_{n+1}P+r'_{n+2}P+ \ldots r'_{n+t}P)$, and the newly-added t members reserve the $X'_i$ values received in the key negotiation stage.

For example, it is assumed that a group $\Sigma=\{(U_1, \ldots, U_5\}$ has executed the basic negotiation, and has obtained the shared key $K=r_1(r_2P+r_3P+ \ldots +r_5P)$. A member $G=\{U_6\}$ needs to join the group and shares a new key with members in the group $\Sigma$. According to the method in this embodiment, the key negotiation process requires $U_1$ to interact with the newly joined member $U_6$, such that all the group members are enabled to compute and obtain the new group key. In this example, after $U_1, U_2, \ldots, U_6$ together form a star-shaped structure, the following specific steps are executed:

(1) The organizer $U_1$ selects the DH secret value $r'_1 \square Z_q$ according to the system parameters, and broadcasts the message $X'_1=(x'_1, y'_1)=r'_1P$ to $U_6$. $U_6$ selects a DH secret value $r'_6 \square Z_q$ according to the system parameters, and broadcasts a message $X'_6=(x'_6, y'_6)=r'_6P$ to $U_1$.

(2) After receiving the DH public value $X'_6$ broadcasted by $U_6$, supposed that secret exponent $Z'=x_K$, the organizer $U_1$ computes the intermediate message DH value $z'P=(x', y')$ based on Diffie-Hellman key negotiation protocol on the Elliptic-Curve, generates an intermediate message $\{c'_1, c'_6\}=\{r'_1x'(\bmod p), r'_6z'P\}$ carrying the intermediate message DH value, broadcasts the intermediate message $\{(c'_1, c'_6\}=\{r'_1x'(\bmod p), r'_6z'P\}$ in the group, and generates a group key $K'=r'_1r'_6P$ according to the DH secret value selected by the organizer itself and the DH public value of $U_6$.

In the example, $x_K$ represents an x-coordinate of the key K shared by $\Sigma=\{U_1, U_2, \ldots, U_5\}$.

(3) After receiving the intermediate message broadcasted by the organizer $U_1$, $U_6$ extracts the intermediate message DH value in the intermediate message, in which the intermediate message DH value $z'P$ is specifically obtained by computing $z'P=(x', y')=r'_6^{-1}c'_6$, and then, according to the intermediate message DH value $z'P=(x', y')$, the x' is obtained. As $c=r'_1x'(\bmod p)$, $r'_1=c'_1x'^{-1}(\bmod p)$, the DH secret value $r'_1$ selected by the organizer $U_1$ is computed.

(4) After computing the DH secret value $r'_1$ selected by the organizer $U_1$, $U_6$ verifies whether the equation $r'_1P=X'_1$ is satisfied or not, and if yes, (5) is executed; otherwise, (1) is re-executed.

The verification of the equation $r'_1P=X'_1$ aims at verifying whether the DH secret value selected by the organizer is tampered or not.

(5) $U_6$ generates a group key $K'=r'_1r'_6P$ according to the DH secret value $r'_1$ selected by the organizer $U_1$ and the DH public value of $U_6$.

(6) The other members $U_2, \ldots, U_5$ in the group $\Sigma$ obtain $z'=x_K$ according to the previous z value, compute $z'P=(x', y')=r'_i^{-1}c'_i$ ($i \square \{2, \ldots, 5\}$), and obtain the x'according to the intermediate message DH value $z'P=(x', y')$. As $c'_1=r'_1x'(\bmod p)$, $r'_1=c'_1x'^{-1}(\bmod p)$, so that the DH secret value $r'_1$ selected by the organizer $U_1$ is computed. Then, according to the DH secret value $r'_1$ selected by the organizer $U_1$ and the DH public value of the new member $U_6$, each of the other members $U_2, \ldots, U_5$ generates a group key $K'=r'_1r'_6P$.

Through the above method, all the members obtain the same group key $K'=r'_1r'_6P$.

Embodiment 3

Figure 6:
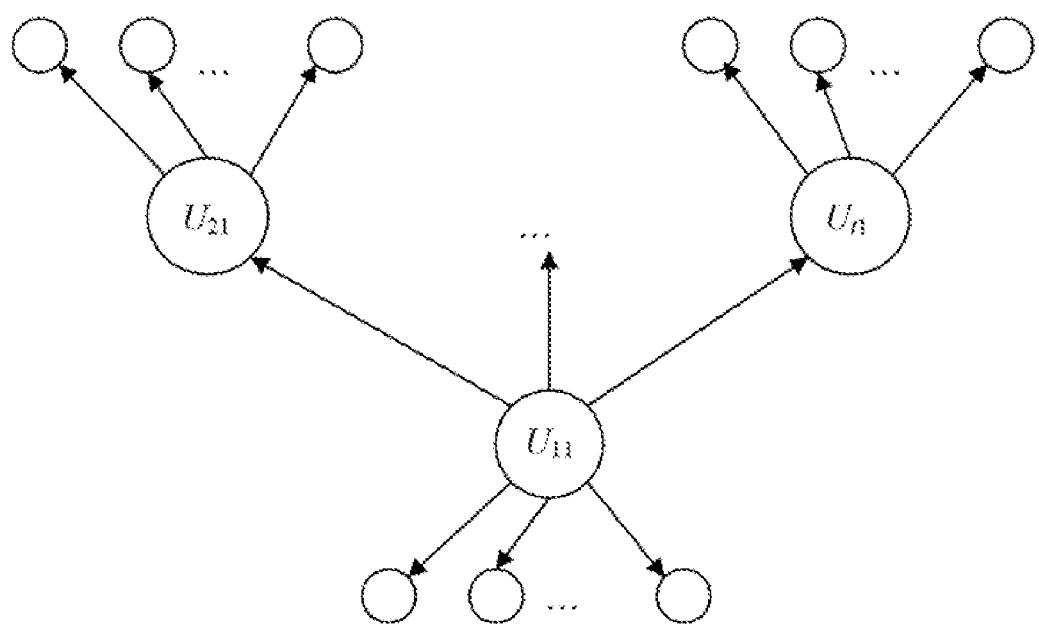
FIG. 6 is a schematic view of a star-shaped structure formed by group members when groups are combined according to Embodiment 3 of the present invention.
Figure 7:
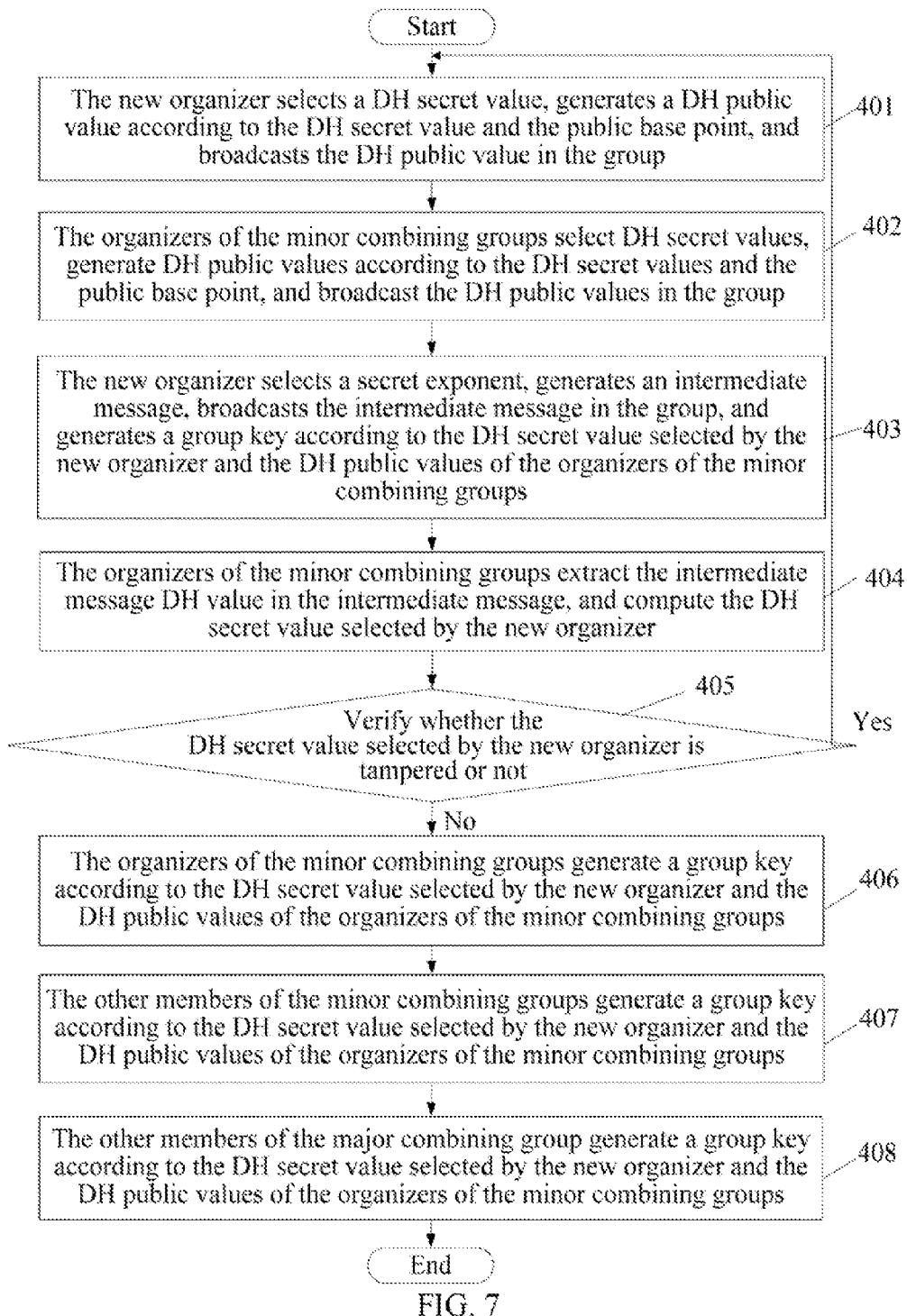
FIG. 7 is a flow chart of a method for generating a group key when groups are combined according to Embodiment 3 of the present invention.

In this embodiment, a method for generating a group key through negotiation when groups are combined is provided. This embodiment is based on Embodiment 1. t groups need to be combined, which are represented as $\{\Sigma_1, \Sigma_2, \ldots, \Sigma_t\}$ respectively, and each group $\Sigma_i$ has $n_i$ members, i.e., $\Sigma_i=\{U_{i1}, U_{i2}, \ldots, U_{in_i}\}$ ($i \square \{1, t\}$). Each group has executed the basic negotiation in Embodiment 1 respectively, and the members in the group $\Sigma_i$ share a group key $K_i$. Herein, $U_{11}$, is selected as a new organizer, $\Sigma_1$ is a major combining group, and $\Sigma_2, \ldots, \Sigma_t$ are minor combining groups. The negotiation process requires the organizer $U_{i1}$ of each group $\Sigma_i$ to participate in. Referring to FIG. 6, the groups to be combined form a star-shaped structure together, and referring to FIG. 7, the key negotiation process is described as follows.

401: $U_{11}$ selects a DH secret value $r'_{11} \square Z_q$ according to system parameters, generates a DH public value $X'_{11}=(x'_{11}, y'_{11})=r'_{11}P$ according to the DH secret value $r'_{11}$ and a public base point P, and broadcasts the DH public value $X'_{11}=(x'_{11}, y'_{11})=r'_{11}P$ in the group.

402: Supposed that a DH secret value $r'_{i1}=x_{K_i}$, the organizer $U_{i1}$ of each of the minor combining groups $\Sigma_2, \ldots, \Sigma_t$ generates a DH public value $X'_{i1}=(x'_{i1}, y'_{i1})=r'_{i1}P$ according to the DH secret value $r'_{i1}$, and the public base point P, and broadcasts the DH public value $X'_{i1}=(x'_{i1}, y'_{i1})=r'_{i1}P$ in the group, in which i goes through 2, . . . , t.

In the embodiment, $x_{K_i}$ represents an x-coordinate of the key $K_i$ shared in the $\Sigma_i=\{(U_{i1}, U_{i2}, \ldots, U_{in_i}\}$ ($i \square \{1, t\}$), and all the group members know that the organizer $U_{i1}$ selects the x-coordinate or the y-coordinate as z' in advance. In this embodiment, the organizer $U_{i1}$ selects the x-coordinate as z', and may also supposed that $z'=y_{K_i}$ that is, it organizer $U_{i1}$ selects the y-coordinate as z'.

403: After receiving the DH public value $X'_{i1}$ broadcasted by $U_{i1}$, supposed that a secret exponent $z'=x_{K_1}$, $U_{11}$ computes an intermediate message DH value $z'P=(x', y')$ based on Diffie-Hellman key negotiation protocol on the Elliptic-Curve, generates an intermediate message $\{c'_1, c'_2, \ldots, c'_t\}=\{r'_{11}x' \pmod{p}, r'_{21}z'P, r'_{31}z'P, \ldots, r'_{t1}z'P\}$ carrying the intermediate message DH value, broadcasts the intermediate message $\{c'_1, c'_2, \ldots, c'_t\}=\{r'_{11}x'\pmod{p}, r'_{21}z'P, r'_{31}z'P, \ldots, r'_{t1}z'P\}$ in the group, and generates a new group key $K'=r'_{11}(r'_{21}P+r'_{31}P+\ldots+r'_{t1}P)$ according to the DH secret value $r'_{11}$ selected by $U_{11}$ itself and the DH public value of $U_{i1}$.

404: After receiving the intermediate message broadcasted by $U_{11}$, $U_{i1}(i\square\{2, \ldots, t\})$ extracts the intermediate message DH value in the intermediate message, in which the intermediate message DH value $z'P$ is specifically obtained by computing $z'P=(x', y')=r'_{i1}{}^{-1}c'_i$, and then, according to the intermediate message DH value $z'P=(x', y')$, the x' is obtained. As $c'_1=r'_{11}x'\pmod{p}$, $r'_{11}=c'_1x'^{-1}\pmod{p}$, so that the DH secret value $r'_{11}$ selected by the organizer is computed.

405: After computing the DH secret value $r'_{11}$ selected by $U_{11}$, $U_{i1}(i\square\{2, \ldots, t\})$ verifies whether an equation $r'_{11}P=X'_{11}$ is satisfied or not, and if yes, 406 is executed; otherwise, 401 is re-executed.

The verification of the equation $r'_{11}P=X'_{11}$ aims at verifying whether the DH secret value selected by $U_{11}$ is tampered or not.

406: $U_{i1}(i\square\{2, \ldots, t\})$ generates a group key $K'=r'_{11}(r'_{21}P+r'_{31}P+\ldots+r'_{t1}P)$ according to the DH secret value $r'_{11}$ selected by $U_{11}$ and the DH public value of $U_{i1}$.

407: The other members in the minor combining group $\Sigma_i$ ($i\square\{2, \ldots, t\}$) except the organizers obtain $z'=x_{K_i}$ according to the previous z value, compute $z'P=(x', y')=r'_{i1}{}^{-1}c'_i(i\square\{1, 2, \ldots, t\})$, and obtain the x' according to the intermediate message DH value $z'P=(x', y')$. As $c'_1=r'_{11}x'\pmod{p}$, $r'_{11}=c'_1x'^{-1}\pmod{p}$, so that the DH secret value $r'_{11}$ selected by the organizer is computed. Then, according to the DH secret value $r'_{11}$ selected by $U_{11}$ and the DH public value of $U_{i1}$, each of the other members in the minor combining group $\Sigma_i(i\square\{2, \ldots, t\})$ generates a new group key $K'=r'_{11}(r'_{21}P+r'_{31}P+\ldots r'_{t1}P)$.

408: According to the $x_{K_i}$ obtained in advance, the other members in the major combining group $\Sigma_i$ except the organizer compute $z'P=(x', y')=r'_{i1}{}^{-1}c'_i(i\square\{1, 2, \ldots, t\})$, and then obtain the corresponding x' according to the intermediate message DH value $z'P=(x', y')$. As $c'_1=r'_{11}x'\pmod{p}$, $r'_{11}=c'_1x'^{-1}\pmod{p}$, so that the DH secret value $r'_{11}$ selected by the organizer is obtained. Then, according to the DH secret value $r'_{11}$, selected by $U_{11}$ and the DH public value of $U_{i1}$, each of the other members in the major combining group $\Sigma_1$ generates a new group key $K'=r'_{11}(r'_{21}P+r'_{31}P+\ldots r'_{t1}P)$.

Through the above method, f groups are combined into one group with $U_{11}$ as the organizer, and all the members share the group key $K'=r'_{11}(r'_{21}P+r'_{31}P+\ldots r'_{t1}P)$.

Embodiment 4

In this embodiment, a method for generating a group key when members leave the group is provided. This embodiment is based on Embodiment 1. It is assumed that the members in the group $\Sigma=\{U_1, \ldots, U_n\}$ has executed the basic negotiation of Embodiment 1. k members $\Sigma'=\{U_{j_1}, \ldots, U_{j_k}\}$ need to leave the group and the other group members $\Sigma'''=\{U_1, \ldots, U_{j_1-1}, \ldots, U_{j_1+1}, \ldots, U_{j_k-1}, \ldots, U_{j_k+1}, \ldots, U_n\}$ remain in the group. The remaining group members are required to compute a new group key to prevent the members who have left the group from obtaining the group key of the current group, and the following specific steps are performed.

First, after k members leave the group $\Sigma$, the organizer $U_1$ re-selects the DH secret value $r'_1$, $z'\square Z_q$ according to the system parameters, and the other members in G'' do not need to re-select the DH secret values.

Next, the other group members $\Sigma'''=\{U_1, \ldots, U_{j_1-1}, U_{j_1+1}, \ldots, U_{j_k-1}, U_{j_k+1}, \ldots, U_n\}$ perform the group key negotiation method in Embodiment 1 once again, generate a new intermediate message $\{c'_1, \ldots, c'_{j_1-1}, c'_{j_1+1}, \ldots, c'_{j_k-1}, c'_{j_k+1}, \ldots, c'_n\}=\{r'_1x'\pmod{p}, \ldots, r'_{j_1-1}z'P, r'_{j_1+1}z'P, \ldots, r'_{j_k-1}z'P, r'_{j_k+1}z'P, \ldots, r'_nz'P\}$, and generate a new group key $K'=r'_1(r_2P+\ldots+r_{j_1-1}P, r_{j_1+1}P+r_{j_k-1}P, r_{j_k+1}P+\ldots r_nP)$ for sharing.

If the organizer in the original group $\Sigma$ has left the group, it is required to re-select a member to be the organizer in the group G''', and then execute the above steps to generate a new group key $K'=r'_1(r_2P+\ldots+r_{j_1-1}P+r_{j_1+1}P+r_{j_k-1}P+r_{j_k+1}P+\ldots+r_nP)$ for sharing.

Embodiment 5

As the scale of the group is continuously expanded, the computation load and the communication load of the organizer are increased rapidly. When the scale of the network is increased to an extent, the performance of the organizer becomes a bottleneck of the protocol, so that it needs to modify the performance of the organizer appropriately, so as to reduce the load of the organizer.

In this embodiment, a group key negotiation method in communication of a large-scale group is provided. This embodiment is based on Embodiment 1. When the scale of group members who participate in the negotiation is very large, the members in a group $\Sigma$ are divided into m subgroups, which are remarked as $\Sigma=\{\Sigma_1, \Sigma_2, \ldots, \Sigma_m\}$, and all the nodes form a star-shaped structure. Each sub-group $\Sigma_i$ has $n_i$ members, which are remarked as $\{U_{i1}, U_{i2}, \ldots, U_{in_i}\}$. The $n_i$ members may also form a star-shaped structure, and $U_{i1}$ becomes an organizer of the sub-group $\Sigma_i$.

As for a group dividing method, the group may be divided according to a unique machine code corresponding to each node device (similar to a MAC address of an Ethernet network card), and may also be divided according to geographical locations. The following steps are performed.

First, $n_i$ members in the sub-group $\Sigma_i$ (i=1, 2, . . . , m) form a star-shaped structure, and perform the basic negotiation in Embodiment 1, so as to obtain a group key $K_i=r_{i1}(r_{i2}P+r_{i3}P+\ldots+r_{in_i}P)$.

Next, the organizer $U_{11}$ of the sub-group $\Sigma_1$ is selected as an organizer of the group $\Sigma$, and the organizers $U_{i1}$ of the sub-groups $\Sigma_i$, on behalf of each sub-group, form a star-shaped structure together with $U_{11}$, so as to perform the basic negotiation of Embodiment 1 once again.

$U_{11}$ re-selects a DH secret value $r'_{11} \in Z_q$, generates a DH public value $X'_{11}=(x'_{11}, y'_{11})=r'_{11}P$ according to the DH secret value $r'_{11}$ and the public base point P, and broadcasts the DH public value $X'_{11}=(x'_{11}, y'_{11})=r'_{11}P$ in the group.

$U_{i1}(i \in \{1, 2, \ldots, n\})$ participates in the computation by taking the x-coordinate $x_{K_i}$ of the individual group key $K_i$, that is $x_{K_i}$ as a DH secret value, generates a DH public value $X'_{i1}=(x'_{i1}, y'_{i1})=x_{K_i}P$ according to the DH secret value $x_{K_i}$ and the public base point P, and broadcasts the DH public value $X'_{i1}=(x'_{i1}, y'_{i1})=x_{K_i}P$ in the group.

$U_{11}$ takes the x-coordinate $x_{K_1}$ of the key value $K_1$ of the sub-group $\Sigma_1$, that is $x_{K_1}$, as a new secret exponent $z'=x_{K1}$, computes an intermediate message DH value $z'P=(x', y')$ based on the Diffie-Hellman key negotiation protocol on the Elliptic-Curve, generates an intermediate message $\{c'_1, c'_2, \ldots, c'_t\}=\{r'_{11}x'(\bmod p), x_{K_2}P, x_{K_3}P, \ldots x_{K_m}P\}$ carrying the intermediate message DH value, broadcasts the intermediate message $\{c'_1, c'_2, \ldots, c'_t)\}=\{r'_{11}x'(\bmod p), x_{K_2}P, x_{K_3}P, \ldots, x_{K_m}P\}$ in the group, and generates a group key $K=r'_{11}(x_{K_2}P+x_{K_3}P+ \ldots +x_{K_m}P)$ according to the DH secret value $r'_{11}$ selected by $U_{11}$ itself and the received DH public value $X'_{i1}=(x'_{i1}, y'_{i1})=x_{K_i}P$ broadcasted by $U_{i1}$.

After receiving the intermediate message broadcasted by the organizer $U_{11}$, $U_{i1}$ ($i \in \{2, \ldots, m\}$) extracts the intermediate message DH value in the intermediate message, in which the intermediate message DH value $z'P=(x', y')$ is specifically obtained by computing $z'P=(x', y')=x_{K_i}^{-1}c'_i$, and then, according to the intermediate message DH value $z'P=(x', y')$, the x' is obtained. As $c'_1=r'_{11}x'(\bmod p)$, $r'_{11}=c'_1x'^{-1}(\bmod p)$, so that the DH secret value $r'_{11}$, selected by the organizer $U_{11}$ is obtained. According to $r'_{11}$ and the DH public value of $U_{i1}$ ($i \in \{2, \ldots, m\}$), $U_{i1}$ generates a group key $K=r'_{11}(x \, x_{K_2}P+x_{K_3}P+ \ldots +x_{K_m}P)$.

Simultaneously, the other members $U_{ij}(i \in [1, m], j \in [1, n_i])$ in the group $\Sigma$ monitor the message sent to the corresponding group $\Sigma_i$, obtain $x_{K_i}$ by using the obtained key $K_i$ of the sub-group $\Sigma_i$, and compute the DH secret value $r'_{11}$ by using the broadcasted intermediate message, so as to obtain the sharing group key $K=r'_{11}(x_{K_2}P+x_{K_3}P+ \ldots +x_{K_m}P)$.

Finally, all the members obtain the same group key $K=r'_{11}(x_{K_2}P+x_{K_3}P+ \ldots +x_{K_m}P)$.

Through the above method, the group $\Sigma$ is divided into m sub-groups$=\{\Sigma_1, \Sigma_2, \ldots, \Sigma_m\}$ to reduce the load of the organizer in the group $\Sigma$, and all the members in the group $\Sigma$ share the group key $K=r'_{11}(x_{K_2}P+x_{K_3}P+ \ldots +x_{K_m}P)$.

Embodiment 6

Figure 8:
FIG. 8 is a structural view of a system for generating a group key according to Embodiment 6 of the present invention.

Referring to FIG. 8, a system for generating a group key is provided. The system includes a communication device as an organizer and a communication device as members.

The communication device as the organizer is configured to select a DH secret value according to system parameters, generate a DH public value according to the system parameters and the selected DH secret value, and broadcast the DH public value in the group; and after receiving DH public values of other devices, the communication device as the organizer is further configured to select a secret exponent, compute an intermediate message DH value according to the secret exponent, generate an intermediate message carrying the intermediate message DH value, broadcast the intermediate message in the group, and generate a group key according to the selected DH secret value and the DH public values of all the devices in the group.

The communication device as the members is configured to select DH secret values according to the system parameters, generate DH public values according to the system parameters and the selected DH secret values, and broadcast the DH public values; and after receiving the DH public value and the intermediate message broadcasted by the communication device as the organizer, the communication device as the members is further configured to compute the DH secret value selected by the organizer according to the intermediate message, verify the DH secret value to be correct, and then generate a group key according to the DH secret value and the DH public values of all the devices in the group.

When members join or leave the group, the communication device as the organizer and the communication device as the members in the system are further configured to re-generate and broadcast new DH public values.

Embodiment 7

Figure 9:
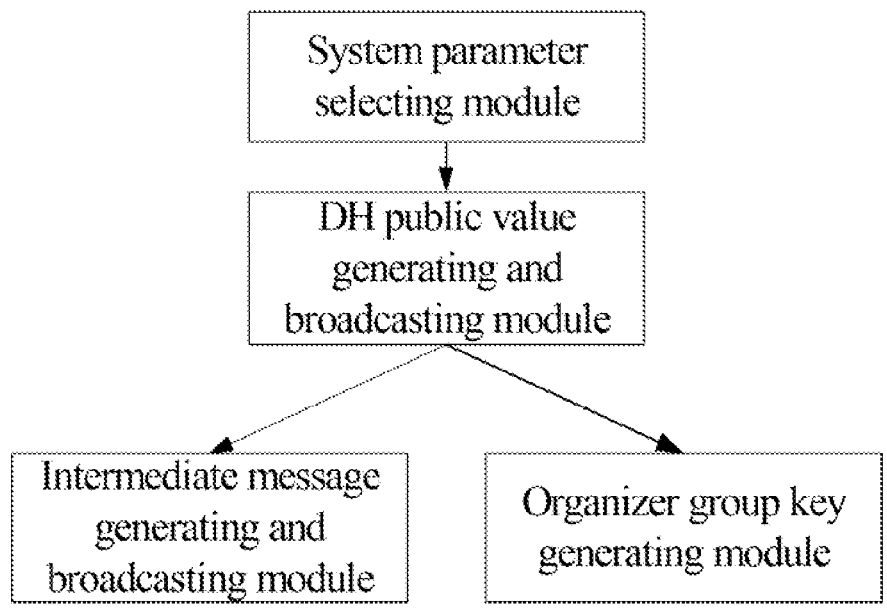
FIG. 9 is a structural view of a communication device according to Embodiment 7 of the present invention.

Referring to FIG. 9, a communication device is provided. The device includes: a system parameter selecting module, a DH public value generating and broadcasting module, an intermediate message generating and broadcasting module, and an organizer group key generating module.

The system parameter selecting module is configured to select system parameters based on an elliptic curve.

The DH public value generating and broadcasting module is configured to select a DH secret value according to the system parameters selected by the system parameter selecting module, generate a DH public value according to the system parameters and the selected DH secret value, and broadcast the generated DH public value.

The intermediate message generating and broadcasting module is configured to select a secret exponent after receiving DH public values broadcasted by other communication devices, compute an intermediate message DH value according to the secret exponent, generate an intermediate message carrying the intermediate message DH value according to the DH secret value selected by the DH public value generating and broadcasting module, and broadcast the intermediate message.

The organizer group key generating module is configured to receive the DH public values broadcasted by other communication devices, and generate a group key according to the DH secret value selected by the DH public value generating and broadcasting module and the DH public values broadcasted by other communication devices.

In order to further improve the communication device, when members join or leave the group, the communication device further includes a group key updating module.

The group key updating module is configured to instruct the DH public value generating and broadcasting module to generate and broadcast a new DH public value when new members join or leave the group.

When new members join the group, the process of generating a new group key is described as follows.

The group key updating module instructs the DH public value generating and broadcasting module to select a new DH secret value for the organizer and the new members according to the system parameters selected by the system parameter selecting module, to generate a new DH public value according to the system parameters and the selected new DH secret value, and to broadcast the new DH public value.

The intermediate message generating and broadcasting module selects a new secret exponent after receiving DH public values of the new members broadcasted by other devices, computes a new intermediate message DH value according to the new secret exponent, generates a new intermediate message carrying the new intermediate message DH value according to the new DH secret value selected by the DH public value generating and broadcasting module, and broadcasts the new intermediate message.

The organizer group key generating module generates a new group key according to the new DH secret value selected by the DH public value generating and broadcasting module and the received DH public values of the new members broadcasted by other devices.

When members leave the group, the process of generating a new group key is described as follows.

The group key updating module instructs the DH public value generating and broadcasting module to select a new DH secret value for the organizer according to the system parameters selected by the system parameter selecting module, to generate a new DH public value according to the system parameters and the selected new DH secret value, and to broadcast the new DH public value.

The intermediate message generating and broadcasting module selects a new secret exponent after receiving DH public values of the remaining members broadcasted by other devices, computes a new intermediate message DH value according to the new secret exponent, generates a new intermediate message carrying the new intermediate message DH value according to the new DH secret value selected by the DH public value generating and broadcasting module, and broadcasts the new intermediate message.

The organizer group key generating module generates a new group key according to the new DH secret value selected by the DH public value generating and broadcasting module and the received DH public values of the remaining members broadcasted by other devices.

Embodiment 8

Figure 10:
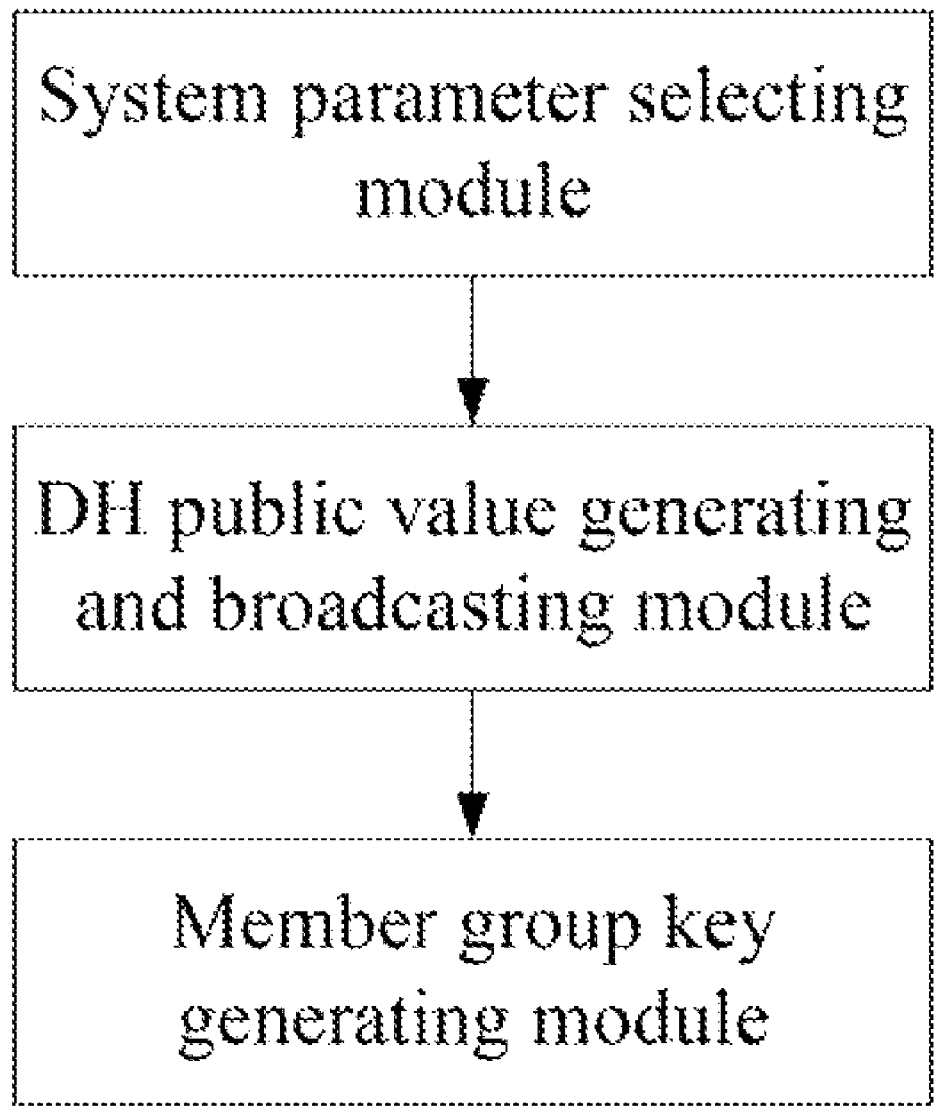
FIG. 10 is a structural view of another communication device according to Embodiment 8 of the present invention.

Referring to FIG. 10, another communication device is provided. The device includes: a system parameter selecting module, a DH public value generating and broadcasting module, and a member group key generating module.

The system parameter selecting module is configured to select system parameters based on an elliptic curve.

The DH public value generating and broadcasting module is configured to select DH secret values according to the system parameters selected by the system parameter selecting module, generate DH public values according to the system parameters and the selected DH secret values, and broadcast the generated DH public values.

The member group key generating module is configured to receive DH public values and an intermediate message broadcasted by another communication device, compute a DH secret value selected by an organizer according to the intermediate message, verify the DH secret value to be correct according to the DH public value broadcasted by the communication device that broadcasts the intermediate message, and generate a group key according to the DH secret value and DH public values broadcasted by the other communication devices except the communication device that broadcasts the intermediate message.

In order to further improve the communication device, when members join or leave the group, the communication device further includes a group key updating module.

The group key updating module is configured to instruct the DH public value generating and broadcasting module to generate and broadcast new DH public values for newly joined members when new members join the group.

When new members join the group, the group key updating module instruct the DH public value generating and broadcasting module to select new DH secret values for the new members according to the system parameters selected by the system parameter selecting module, to generate new DH public values of the new members according to the system parameters and the selected new DH secret values, and to broadcast the new DH public values of the new members. After receiving the new intermediate message, the member group key generating module computes a new DH secret value selected by an organizer according to the new intermediate message, verifies the new DH secret value to be correct according to the received new DH public value of the organizer, and generates a new group key according to the new DH secret value and the new DH public values of the new members broadcasted by the DH public value generating and broadcasting module.

When members leave the group, after receiving a new intermediate message, the member group key generating module computes a new DH secret value selected by the organizer according to the new intermediate message, verifies the new DH secret value to be correct according to the received new DH public value of the organizer, and generates a new group key according to the new DH secret value and new DH public values of the remaining members broadcasted by the DH public value generating and broadcasting module.

The above embodiments have the following advantages.

1) High security: The computation complexity of the elliptic curve discrete logarithm problem is at the exponential level currently, but the RSA public key cryptosystem is at the sub-exponential level.

2) Low computation load and high processing speed: Under the same computation resource condition, the elliptic curve cryptography system has a higher processing speed as compared with the RSA and the digital signature algorithm (DSA).

3) Small storage space: The key length and system parameters of the elliptic curve cryptography system are much shorter than that of the RSA and DSA. The 160-bit elliptic curve cipher (ECC) realizes the same security level as the 1024-bit RSA or DSA, and the 210-bit ECC realizes the same security level as the 2048-bit RSA or DSA, which means that the elliptic curve cryptography system occupies a much smaller storage space.

4) Low bandwidth requirement: For a given security level, the ECC has a smaller parameter than the RSA and DSA. For a higher security level, the difference in the sizes of the parameters of the ECC and the RSA and DSA is more obvious. The parameter in a smaller size brings advantages of a high computation speed, a short key, and a small key certificate, and thus the signature length and cipher text length are also short.

In view of the above, the FCC can realize a high security with a small overhead (such as, bandwidth, computation load, storage space, and power consumption) and a small delay, which is especially suitable for the situation when the computation capability and bandwidth are rather limited, such as the security communication in an Ad Hoc network environment. Compared with similar solutions, when realizing the same security level, the ECC has the advantages of a high computation speed, a small storage space, a low network bandwidth requirement, and the like.

The embodiments of the present invention support the joining and leaving motions of the members. Specifically, when members join the group, the newly joined members and the organizer are required to participate in the negotiation, and when members leave the group, the organizer is required to re-select a random number, without re-selecting random numbers for the remaining members. Thus, the embodiments of the present invention have a high computation speed, occupy a small storage space, and are flexible in usage.

When being applied in a large-scale group communication, the technical solutions of the embodiments of the present invention can effectively reduce the computation load of the organizer while slightly increasing the communication load. Meanwhile, as the protocol is based on the elliptic curve cryptography system, the higher protocol operation efficiency can be achieved, including less message exchanges, lower occupied network bandwidth, smaller key storage space, and higher computation speed.

The technical solutions of the above embodiments can be implemented through hardware and software, and the software is stored in a readable storage medium, such as a floppy disk, a hard disk, or an optical disk of a computer.

The above descriptions are merely preferred embodiments of the present invention, but not intended to limit the present invention. Any modification, equivalent replacement, and improvement made without departing from the principle of the present invention shall fall within the scope of the present invention.

What is claimed is:

1. A method for generating a group key, wherein system parameters are selected based on an elliptic curve, the method comprising:

forming, by group members, a star-shaped structure, and selecting an organizer from the group members;

randomly selecting, by the group members, DH secret values according to the system parameters individually, generating DH public values individually according to the system parameters and the selected DH secret values, and broadcasting the DH public values in the group;

selecting, by the organizer, a secret exponent after receiving the DH public values of the other group members, computing an intermediate message DH value according to the secret exponent, generating an intermediate message carrying the intermediate message DH value, broadcasting the intermediate message in the group, and generating a group key according to the DH secret value selected by the organizer and the DH public values of the other group members; and computing, by the other group members, the DH secret value selected by the organizer according to the intermediate message after receiving the intermediate message and the DH public value of the organizer, verifying the computed DH secret value selected by the organizer to be correct according to the received DH public value of the organizer, and generating a group key according to the DH secret value selected by the organizer and the DH public values of the other group members;

wherein the computing the intermediate message DH value according to the secret exponent further comprises:

computing the intermediate message DH value zP according to the secret exponent z, wherein the secret exponent z is a random number selected from a collection $Z_q$ of minimum non-negative residues obtained after integers are modulo q, q is a prime number among the system parameters, and P is a public base point in the system parameters;

wherein the generating the intermediate message carrying the intermediate message DH value further comprises:

extracting an x-coordinate x of the intermediate message DH value zP on the elliptic curve, and computing an organizer component $r_1x(\bmod p)$ of the intermediate message according to the DH secret value $r_1$ selected by the organizer, wherein p is a prime number among the system parameters;

computing the other member components $r_2zP, r_3zP, \ldots r_nzP$ of the intermediate message according to the secret exponent z and the DH public values $X_i=r_iP$ broadcasted by the other group members except the organizer, wherein $i=2, \ldots, n$, and n is the number of the group members; and generating the intermediate message $\{c_1, c_2, \ldots, c_n\} = \{r_1x(\bmod p), r_2zP, r_3zP, \ldots, r_nzP\}$ according to the organizer component of the intermediate message and the other member components of the intermediate message;

or extracting a y-coordinate y of the intermediate message DH value zP on the elliptic curve, and computing an organizer component $r_1y(\bmod p)$ of the intermediate message according to the DH secret value $r_1$ selected by the organizer, wherein p is a prime number among the system parameters;

computing the other member components $r_2zP, r_3zP, r_nzP$ of the intermediate message according to the secret exponent z and the DH public values $X_i=r_iP$ broadcasted by the other group members except the organizer, wherein $i=2, \ldots, n$, and n is the number of the group members; and generating the intermediate message $\{c_1, c_2, \ldots, c_n\} = \{r_1y(\bmod p), r_2zP, r_3zP, \ldots, r_nzP\}$ according to the organizer component of the intermediate message and the other member components of the intermediate message.

2. The method according to claim 1, wherein the computing the DH secret value selected by the organizer according to the intermediate message further comprises:

computing the intermediate message DH value zP according to the intermediate message $\{c_1, c_2, \ldots, c_n\} = \{r_1x(\bmod p), r_2zP, r_3zP, \ldots, r_nzP\}$ and the selected DH secret value $r_i$, extracting the x-coordinate x of the intermediate message DH value zP on the elliptic curve, and computing the DH secret value $r_1=c_1x^{-1}(\bmod p)$ selected by the organizer; or computing the intermediate message DH value zP according to the intermediate message $\{c_1, c_2, \ldots, c_n\} = \{r_1y(\bmod p), r_2zP, r_3zP, \ldots, r_nzP\}$ and the selected DH secret value $r_i$, extracting the y-coordinate y of the intermediate message DH value zP on the elliptic curve, and computing the DH secret value $r_1=c_1y^{-1}(\bmod p)$ selected by the organizer.

3. A method for generating a group key, wherein system parameters are selected based on an elliptic curve, the method comprising:

forming, by group members, a star-shaped structure, and selecting an organizer from the group members;

randomly selecting, by the group members, DH secret values according to the system parameters individually, generating DH public values individually according to the system parameters and the selected DH secret values, and broadcasting the DH public values in the group;

selecting, by the organizer, a secret exponent after receiving the DH public values of the other group members, computing an intermediate message DH value according to the secret exponent, generating an intermediate message carrying the intermediate message DH value, broadcasting the intermediate message in the group, and generating a group key according to the DH secret value selected by the organizer and the DH public values of the other group members; and computing, by the other group members, the DH secret value selected by the organizer according to the intermediate message after receiving the intermediate message and the DH public value of the organizer, verifying the computed DH secret value selected by the organizer to be correct according to the received DH public value of the organizer, and generating a group key according to the DH secret value selected by the organizer and the DH public values of the other group members;

wherein when new members join the group, the method further comprises:

forming, by the new members and the group members, a new star-shaped structure;

randomly selecting, by the organizer and the new members, new DH secret values according to the system parameters individually, generating new DH public values individually according to the system parameters and the selected new DH secret values, and broadcasting the new DH public values in the group;

taking, by the organizer, an x-coordinate or y-coordinate of the group key as a new secret exponent after receiving the new DH public values, computing a new intermediate message DH value according to the new secret exponent, generating a new intermediate message carrying the new intermediate message DH value, broadcasting the new intermediate message in the group, and generating a new group key according to the new DH secret value selected by the organizer and the new DH public values of the new members; and receiving, by the other group members except the organizer, the new intermediate message of the organizer, the new DH public value of the organizer, and the new DH public values of the new members, computing the new DH secret value selected by the organizer according to the new intermediate message, verifying the new computed DH secret value selected by the organizer to be correct according to the received new DH public value of the organizer, and generating a new group key according to the new DH secret value selected by the organizer and the new DH public values of the new group members.

4. The method according to claim 3, wherein the generating the new intermediate message carrying the new intermediate message DH value further comprises:

extracting an x-coordinate x' of the new intermediate message DH value z'P on the elliptic curve, and computing an organizer component $r'_1 x' \pmod p$ of the new intermediate message according to the new DH secret value $r'_1$ selected by the organizer, wherein p is a prime number among the system parameters, $z'=x_K$, $x_K$ is an x-coordinate of the group key, and P is a public base point in the system parameters;

computing new member components $r'_{n+1}z'P, r'_{n+2}z'P, \ldots, r'_{n+t}z'P$ of the new intermediate message according to the secret exponent z' and the DH public values $X'_i = r'_i P$ broadcasted by the new members, wherein $i=n+1, \ldots, n+t$, n is the number of the group members before the new members join the group, and t is the number of the new members; and generating the new intermediate message $\{c'_1, c'_{n+1}, \ldots, c'_{n+t}\} = \{r'_1 x' \pmod p, r'_{n+1} z'P, r'_{n+2} z'P, \ldots, r'_{n+t} z'P\}$ according to the organizer component of the new intermediate message and the new member components of the new intermediate message;

or extracting a y-coordinate y' of the new intermediate message DH value z'P on the elliptic curve, and computing an organizer component $r'_1 y' \pmod p$ of the new intermediate message according to the new DH secret value $r'_1$ selected by the organizer, wherein p is a prime number among the system parameters, $z'=y_K$, $y_K$ is a y-coordinate of the group key, and P is a public base point in the system parameters;

computing new member components $r'_{n+1}z'P, r'_{n+2}z'P, \ldots, r'_{n+t}z'P$ of the new intermediate message according to the secret exponent z' and the DH public values $X'_i = r'_i P$ broadcasted by the new members, wherein $i=n+1, \ldots, n+t$, n is the number of the group members before the new members join the group, and t is the number of the new members; and generating the new intermediate message $\{c'_1, c'_{n+1}, \ldots, c'_{n+t}\} = \{r'_1 y' \pmod p, r'_{n+1} z'P, r'_{n+2} z'P, \ldots, r'_{n+t} z'P\}$ according to the organizer component of the new intermediate message and the new member components of the new intermediate message.

5. The method according to claim 3, wherein the generating the new group key according to the new DH secret value selected by the organizer and the new DH public values of the new members further comprises:

generating the group key $K' = r'_1(r'_{n+1}P + r'_{n+2}P + \ldots r'_{n+t}P)$ according to the DH public values $X'_i = r'_i P$ of the new members and the new DH secret value $r_1'$ selected by the organizer, wherein $i=n+1, \ldots, n+t$, n is the number of the group members before the new members join the group, t is the number of the new members, and P is the public base point in the system parameters.

6. A method for generating a group key, wherein system parameters are selected based on an elliptic curve, the method comprising:

forming, by group members, a star-shaped structure, and selecting an organizer from the group members;

randomly selecting, by the group members, DH secret values according to the system parameters individually, generating DH public values individually according to the system parameters and the selected DH secret values, and broadcasting the DH public values in the group;

selecting, by the organizer, a secret exponent after receiving the DH public values of the other group members, computing an intermediate message DH value according to the secret exponent, generating an intermediate message carrying the intermediate message DH value, broadcasting the intermediate message in the group, and generating a group key according to the DH secret value selected by the organizer and the DH public values of the other group members; and computing, by the other group members, the DH secret value selected by the organizer according to the intermediate message after receiving the intermediate message and the DH public value of the organizer, verifying the computed DH secret value selected by the organizer to be correct according to the received DH public value of the organizer, and generating a group key according to the DH secret value selected by the organizer and the DH public values of the other group members;

wherein when members leave the group, the method further comprises:

selecting, by the organizer, a new DH secret value according to the system parameters, generating a new DH public value according to the system parameters and the selected new DH secret value, and broadcasting the new DH public value in the group;

selecting, by the organizer, a new secret exponent, computing a new intermediate message DH value according to the new secret exponent, generating a new intermediate message carrying the new intermediate message DH value, broadcasting the new intermediate message in the group, and generating a new group key according to the new DH secret value selected by the organizer and DH public values of the remaining group members except the organizer; and computing, by the remaining group members except the organizer, the new DH secret value selected by the organizer according to the new intermediate message after receiving the new intermediate message and the new DH public value of the organizer, verifying the new DH secret value to be correct according to the received new DH public value of the organizer, and generating a new group key according to the new DH secret value and the DH public values of the remaining group members except the organizer.

7. The method according to claim 6, wherein the generating the new intermediate message carrying the new intermediate message DH value further comprises:

extracting an x-coordinate x' of the new intermediate message DH value z'P on the elliptic curve, and computing an organizer component $r'_1 x'(\mod p)$ of the new intermediate message according to the new DH secret value $r'_1$ selected by the organizer, wherein p is a prime number among the system parameters;

computing remaining-member components $r'_2 z'P, \ldots, r'_{j_1-1} z'P, r'_{j_1+1} z'P, \ldots, r'_{j_k-1} z'P, r'_{j_k+1} z'P, \ldots, r'_n z'P$ of the new intermediate message according to the secret exponent z' and the DH public values $X'_i = r'_i P$ broadcasted by the remaining group members except the organizer, wherein $i = 2, \ldots, j_1-1, j_1+1, \ldots, j_k-1, j_k+1, \ldots n$, and k is the number of the members that leave the group; and generating the new intermediate message $\{c'_1, \ldots, c'_{j_1-1}, c'_{j_1+1}, \ldots, c'_{j_k-1}, c'_{j_k+1}, \ldots, c'_n\} = \{r'_1 x'(\mod p), \ldots, r'_{j_1-1} z'P, r'_{j_1+1} z'P, \ldots, r'_{j_k-1} z'P, r'_{j_k+1} z'P, \ldots, r'_n z'P\}$ according to the organizer component of the new intermediate message and the remaining-member components of the new intermediate message;

or extracting a y-coordinate y' of the new intermediate message DH value z'P on the elliptic curve, and computing an organizer component $r'_1 y'(\mod p)$ of the new intermediate message according to the new DH secret value $r'_1$ selected by the organizer, wherein p is a prime number among the system parameters;

computing remaining-member components $r'_2 z'P, \ldots, r'_{j_1-1} z'P, r'_{j_1+1} z'P, \ldots, r'_{j_k-1} z'P, r'_{j_k+1} z'P, \ldots, r'_n z'P$ of the new intermediate message according to the secret exponent z' and the DH public values $X'_i = r'_i P$ broadcasted by the remaining group members except the organizer, wherein $i = 2, \ldots, j_1-1, j_1+1, \ldots, j_k-1, j_k+1, \ldots n$, and k is the number of the members that leave the group; and generating the new intermediate message $\{c'_1, \ldots, c'_{j_1-1}, c'_{j_1+1}, \ldots, c'_{j_k-1}, c'_{j_k+1}, \ldots, c'_n\} = \{r'_1 y'(\mod p), \ldots, r'_{j_1-1} z'P, r'_{j_1+1} z'P, \ldots, r'_{k_k-1} z'P, r'_{j_k+1} z'P, \ldots, r'_n z'P\}$ according to the organizer component of the new intermediate message and the remaining-member components of the new intermediate message.

* * * * *

UNITED STATES PATENT AND TRADEMARK OFFICE
CERTIFICATE OF CORRECTION

PATENT NO. : 8,280,059 B2  
APPLICATION NO. : 12/603920  
DATED : October 2, 2012  
INVENTOR(S) : Chunxiang Xu, Huan Zhong and Ya Liu Page 1 of 1

It is certified that error appears in the above-identified patent and that said Letters Patent is hereby corrected as shown below:

In claim 7, column 20, line 27, " $r'_{k_k-1} z' P,$ " should read -- $r'_{j_k-1} z' P,$ --

Signed and Sealed this  
Twelfth Day of March, 2013

Teresa Stanek Rea  
*Acting Director of the United States Patent and Trademark Office*